(12) United States Patent
Al-Kiswany et al.

(10) Patent No.: US 9,886,352 B2
(45) Date of Patent: Feb. 6, 2018

(54) DE-DUPLICATED VIRTUAL MACHINE IMAGE TRANSFER

(75) Inventors: Samer Al-Kiswany, Vancouver (CA); Matei Ripeanu, Vancouver (CA)

(73) Assignee: UNIVERSITY OF BRITISH COLUMBIA (CA)

( * ) Notice: Subject to any disclaimer, the term of this patent is extended or adjusted under 35 U.S.C. 154(b) by 780 days.

(21) Appl. No.: 13/824,761

(22) PCT Filed: Apr. 27, 2012

(86) PCT No.: PCT/CA2012/050267
§ 371 (c)(1),
(2), (4) Date: Mar. 18, 2013

(87) PCT Pub. No.: WO2013/159174
PCT Pub. Date: Oct. 31, 2013

(65) Prior Publication Data
US 2014/0188807 A1    Jul. 3, 2014

(51) Int. Cl.
*G06F 17/30*    (2006.01)
*G06F 11/14*    (2006.01)
(Continued)

(52) U.S. Cl.
CPC .......... *G06F 11/1464* (2013.01); *G06F 3/065* (2013.01); *G06F 3/067* (2013.01);
(Continued)

(58) Field of Classification Search
CPC .. G06F 17/30174; G06F 3/0631; G06F 3/065; G06F 3/0662; G06F 11/1464
(Continued)

(56) References Cited

U.S. PATENT DOCUMENTS 7,987,469 B2 *  7/2011  Magro ................ G06F 9/45533
                                                 711/203
8,191,065 B2 *  5/2012  Frank ................. G06F 9/45558
                                                 718/1
(Continued)

FOREIGN PATENT DOCUMENTS

CN   101809559 A    8/2010
EP   EP 1918818 A2  5/2008
WO   2009033074 A2  3/2009

OTHER PUBLICATIONS

Slack, J. et al., Avoiding the Disk Bottleneck in Deduplicated VM Transfer, May 2012, retrieved online on Jan. 10, 2012 from http://www.ece.ubc.ca/~samera/papers/, 9 pages.
(Continued)

*Primary Examiner* — Jean M Corrielus
(74) *Attorney, Agent, or Firm* — Moritt Hock & Hamroff LLP; Steven S. Rubin, Esq.

(57) ABSTRACT

Technologies are generally described for a system and method effective to copy virtual machine images from a source to a destination memory. A processor may copy a first block corresponding to a first virtual machine image from an interim memory to the destination memory. The interim memory may include de-duplicated data present in the first and the second virtual machine images. The processor may identify a second block in the interim memory that corresponds to the second virtual machine image and store the second block in a buffer. The processor may identify a third block in the interim memory that corresponds to the first virtual machine image and copy the third block from the interim memory to the destination memory.

22 Claims, 7 Drawing Sheets

(51) Int. Cl.
*G06F 9/455* (2006.01)
*G06F 3/06* (2006.01)

(52) U.S. Cl.
CPC .......... *G06F 3/0613* (2013.01); *G06F 3/0662* (2013.01); *G06F 9/45558* (2013.01); *G06F 2009/45562* (2013.01)

(58) Field of Classification Search
USPC .......................... 707/634, 640, 692; 711/203
See application file for complete search history.

(56) References Cited

U.S. PATENT DOCUMENTS

| | | | |
|---|---|---|---|
| 8,234,468 B1 | 7/2012 | Deshmukh et al. | |
| 8,386,731 B2* | 2/2013 | Mashtizadeh | G06F 3/0617 707/639 |
| 8,478,725 B2* | 7/2013 | Mashtizadeh | G06F 3/0617 707/640 |
| 8,615,588 B2* | 12/2013 | Dorai | G06F 9/45558 709/226 |
| 8,701,106 B2* | 4/2014 | Frank | G06F 9/45558 718/1 |
| 8,706,947 B1* | 4/2014 | Vincent | G06F 9/5077 711/206 |
| 8,819,660 B2* | 8/2014 | Fries | G06F 8/68 717/168 |
| 8,897,573 B2* | 11/2014 | Chen | G06F 9/45558 382/195 |
| 8,996,800 B2* | 3/2015 | Venkatesh | G06F 17/30132 711/113 |
| 9,189,271 B2* | 11/2015 | Kruglick | G06F 9/45558 |
| 9,311,375 B1* | 4/2016 | Naik | G06F 17/30575 |
| 9,411,651 B2* | 8/2016 | Magro | G06F 9/45533 |
| 9,454,368 B2* | 9/2016 | Vaghani | G06F 3/06 |
| 2007/0038593 A1 | 2/2007 | Critchley et al. | |
| 2008/0222375 A1* | 9/2008 | Kotsovinos | G06F 9/5083 711/162 |
| 2010/0138827 A1* | 6/2010 | Frank | G06F 9/45558 718/1 |
| 2010/0174881 A1 | 7/2010 | Anglin et al. | |
| 2011/0066597 A1* | 3/2011 | Mashtizadeh | G06F 3/0617 707/640 |
| 2011/0066819 A1* | 3/2011 | Mashtizadeh | G06F 3/0617 711/162 |
| 2011/0225130 A1 | 9/2011 | Tokoro | |
| 2011/0264880 A1* | 10/2011 | Ylonen | G06F 12/0261 711/162 |
| 2012/0017031 A1* | 1/2012 | Mashtizadeh | G06F 9/45558 711/6 |
| 2012/0296872 A1* | 11/2012 | Frost | G06F 17/30194 707/634 |
| 2013/0275378 A1* | 10/2013 | Mashtizadeh | G06F 3/0617 707/640 |
| 2014/0050407 A1* | 2/2014 | Chen | G06F 9/45558 382/195 |
| 2014/0052698 A1* | 2/2014 | Chen | G06F 9/45558 707/692 |
| 2014/0229440 A1* | 8/2014 | Venkatesh | G06F 17/30174 707/634 |
| 2014/0229936 A1* | 8/2014 | Gaonkar | G06F 9/45558 718/1 |
| 2014/0245303 A1* | 8/2014 | Magro | G06F 9/45533 718/1 |

OTHER PUBLICATIONS

Al-Kiswany, S. et al., VMFlock: Virtual Machine Co-Migration for the Cloud, Proceedings of the 20th international symposium on High performance distributed computing, 2011, pp. 159-170.

Zhu, B. et al., Avoiding the Disk Bottleneck in the Data Domain Dedeuplication File System, Proceedings of the 6th USENIX Conference on File and Storage Technologies, 2008, 1-14.

Jayaram, K.R., An Empirical Analysis of Similarity in Virtual Machine Images, Proceedings of the Middleware 2011 Industry Track Workshop, 2011, 6 pages.

Nicolae, B. & Cappello, F, Towards Efficient Live Migration of I/O Intensive Workloads: A Transparent Storage Transfer Proposal, Joint INRIA-UIUC Laboratory on PetaScale Computing Technical Report TR-JLPC-11-11, 2011, pp. 1-20.

Upadhyay, A., Application of Data Deduplication and Compression Techniques in Cloud Design, International Institute of Information Technology—Bangalore, Technical Report IIITB-OS-2011-5F, Apr. 2011, pp. 1-37.

International Search Report and Written Opinion for application with application No. PCT/CA2012/050267, dated Jan. 18, 2013, 9 pages.

Reimer, A. Thomas, G. Ammons, T. Mummert, et al. Opening Black Boxes: Using Semantic Information to Combat Virtual Machine Image Sprawl. In ACM Virtual Execution Environments (VEE), 2008, 111-120.

A. Liguori and E. V. Hensbergen. Experiences with content addressable storage and virtual disks. in Workshop on I/O Virtualization (WIOV), 2008, 6 pages.

C. P. Sapuntzakis, R. Chandra, B. Pfaff, J. Chow, et al. Optimizing the migration of virtual computers. in Symposium on Operating Systems Design and Implementation (OSDI), 2002, 14 pages.

A. Muthitacharoen, B. Chen, and D. Mazieres. A Low-bandwidth Network File System. in Symposium on Operating Systems Principles (SOSP), Banff, Canada, 2001, 14 pages.

K. Eshghi, M. Lillibridge, L. Wilcock, G. Belrose, et al. JumboStore: Providing Efficient Incremental Upload and Versioning for a Utility Rendering Service. in USENIX Conference on File and Storage Technologies, FAST. 2007, 16 pages.

T. Hirofuchi, H. Ogawa, H. Nakada, S. Itoh, et al. A Live Storage Migration Mechanism over WAN for Relocatable Virtual Machine Services on Clouds. in International Symposium on Cluster Computing and the Grid (CCGrid). 2009, 6 pages.

R. Bradford, E. Kotsovinos, A. Feldmann, and H. Schioberg. Live wide-area migration of virtual machines including local persistent state. in International conference on Virtual Execution Environments (VEE), 2007, 11 pages.

* cited by examiner

DE-DUPLICATED VIRTUAL MACHINE IMAGE TRANSFER

CROSS-REFERENCE TO RELATED APPLICATION

This application is a U.S. National Stage filing under 35 U.S.C. § 371 of International Application No. PCT/CA2012/050267, filed on Apr. 27, 2012. The disclosure of the International Application No. PCT/CA2012/050267 is hereby incorporated by reference in its entirety.

BACKGROUND

Unless otherwise indicated herein, the materials described in this section are not prior art to the claims in this application and are not admitted to be prior art by inclusion in this section.

A cloud computing system may include one or more processors in communication with one or more memories. Memories may store one or more images of a computing environment. These images may include software programs, libraries, operating systems etc. To facilitate maintenance, backup, or new application deployment, these images may be transferred from one physical memory to another physical memory.

SUMMARY

In an example, a method for copying a first virtual machine image and a second virtual machine image from a source memory to a destination memory is generally described. The method may include copying a first block corresponding to the first virtual machine image from an interim memory to the destination memory. The interim memory may include de-duplicated data that is present in the first virtual machine image and the second virtual machine image. The method may further include identifying a second block in the interim memory that corresponds to the second virtual machine image. The method may further include storing the second block in a buffer. The method may further include identifying a third block in the interim memory that corresponds to the first virtual machine image. The method may further include copying the third block from the interim memory to the destination memory.

In an example, a system effective to copy a first virtual machine image and a second virtual machine image from a source memory to a destination memory is generally described. The system may include an interim memory and a processor. The processor may be configured to communicate with the interim memory and configured to communicate with the source memory and the destination memory. The processor may be effective to copy a first block corresponding to the first virtual machine image from an interim memory to the destination memory. The interim memory may include de-duplicated data present in the first and second virtual machine images. The processor may be effective to identify a second block in the interim memory that corresponds to the second virtual machine image. The processor may be effective to store the second block in a buffer. The processor may be effective to identify a third block in the interim memory that corresponds to the first virtual machine image. The processor may be effective to copy the third block from the interim memory to the destination memory.

In an example, a method for copying a first virtual machine image and a second virtual machine image from a source memory to a destination memory is generally described. The method may include identifying duplicated data. The duplicated data may be present in the first and second virtual machine images. The method may include copying the duplicated data from the source memory to an interim memory to produce de-duplicated data and an image block map. The method may include generating a file map based on the image block map. The file map may identify blocks in the interim memory and virtual machine images corresponding to the blocks. The method may include copying a first block corresponding to the first virtual machine image from the interim memory to the destination memory. The method may include identifying a second block in the interim memory that corresponds to the second virtual machine image. The method may include storing the second block in a buffer. The method may include identifying a third block in the interim memory that corresponds to the first virtual machine image. The method may include copying the third block from the interim memory to the destination memory. The file map may include a first file corresponding to the first virtual machine image. The file map may further include a second file corresponding to the second virtual machine image. The first file may include two or more regions. Each region may include an identification of consecutive blocks of the de-duplicated data corresponding to the first virtual machine image and an indication of whether blocks are stored in the source memory, destination memory, and/or the buffer. The file map may further include a region counter. The region counter may be effective to indicate a number of the second blocks that are stored in the buffer.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
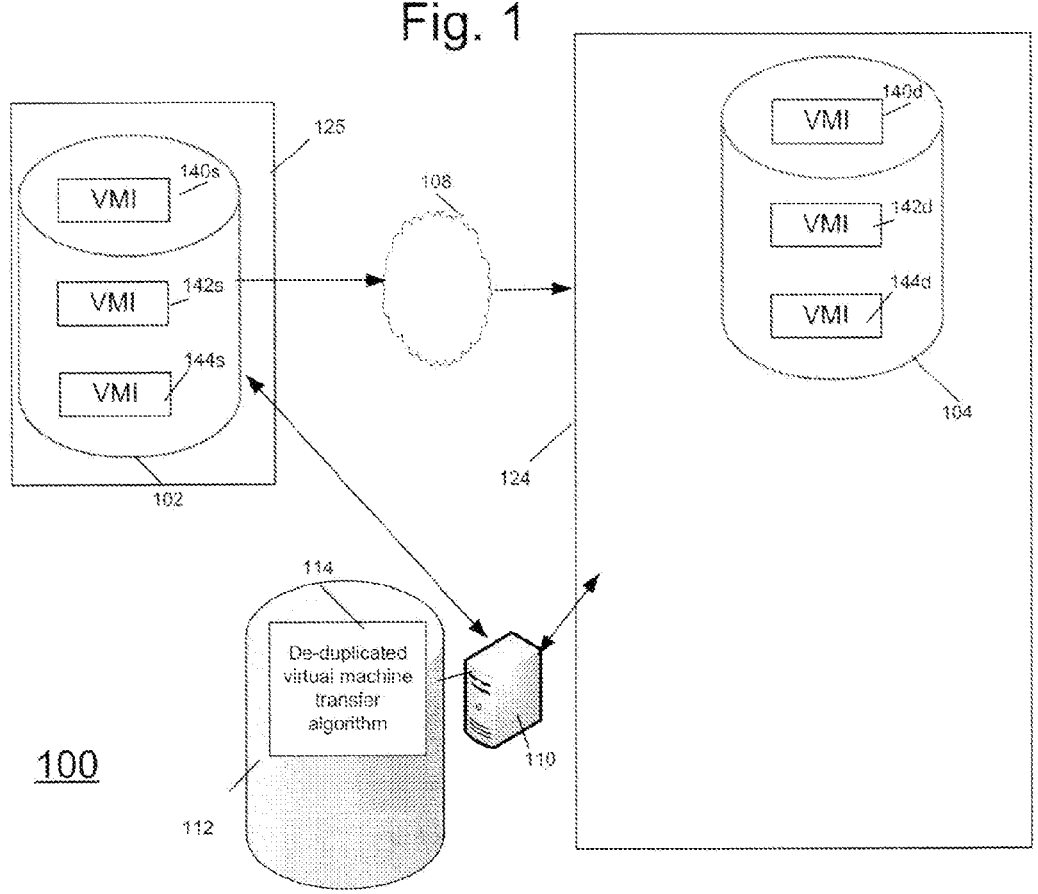
FIG. 1 illustrates some example systems that can be utilized to implement de-duplicated virtual machine image transfer.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to de-duplicated virtual machine image transfer.

Briefly stated, technologies are generally described for a system and method effective to copy virtual machine images from a source to a destination memory. A processor may copy a first block corresponding to a first virtual machine image from an interim memory to the destination memory. The interim memory may include de-duplicated data present in the first and the second virtual machine images. The processor may identify a second block in the interim memory that corresponds to the second virtual machine image and store the second block in a buffer. The processor may identify a third block in the interim memory that corresponds to the first virtual machine image and copy the third block from the interim memory to the destination memory.

FIG. 1 illustrates some example systems that can be utilized to implement de-duplicated virtual machine image transfer arranged according to at least some embodiments described herein. In some examples, as explained in more detail below, a system 100 may include a source memory 102 at a source location 125, a destination memory 104 at a destination location 124, and a transfer processor 110. A memory may include, for example, a general storage medium such as a RAM, disk, solid state drive, etc. Transfer processor 110 may be configured to be in communication with a memory 112. Memory 112 may include a de-duplicated virtual machine transfer algorithm 114. Processor 110 may be adapted to facilitate transfer of one or more virtual machine images 140, 142, 144 from source memory 102 (as indicated by "s") to destination memory 104 (as indicated by "d") such as over a network 108. Processor 110 may operate in accordance with algorithm 114 and may be in communication with source memory 102 and destination memory 104. Processor 110 may physically be located at source location 102, destination location 124 or at neither source nor destination locations such as over network 108.

Figure 2:
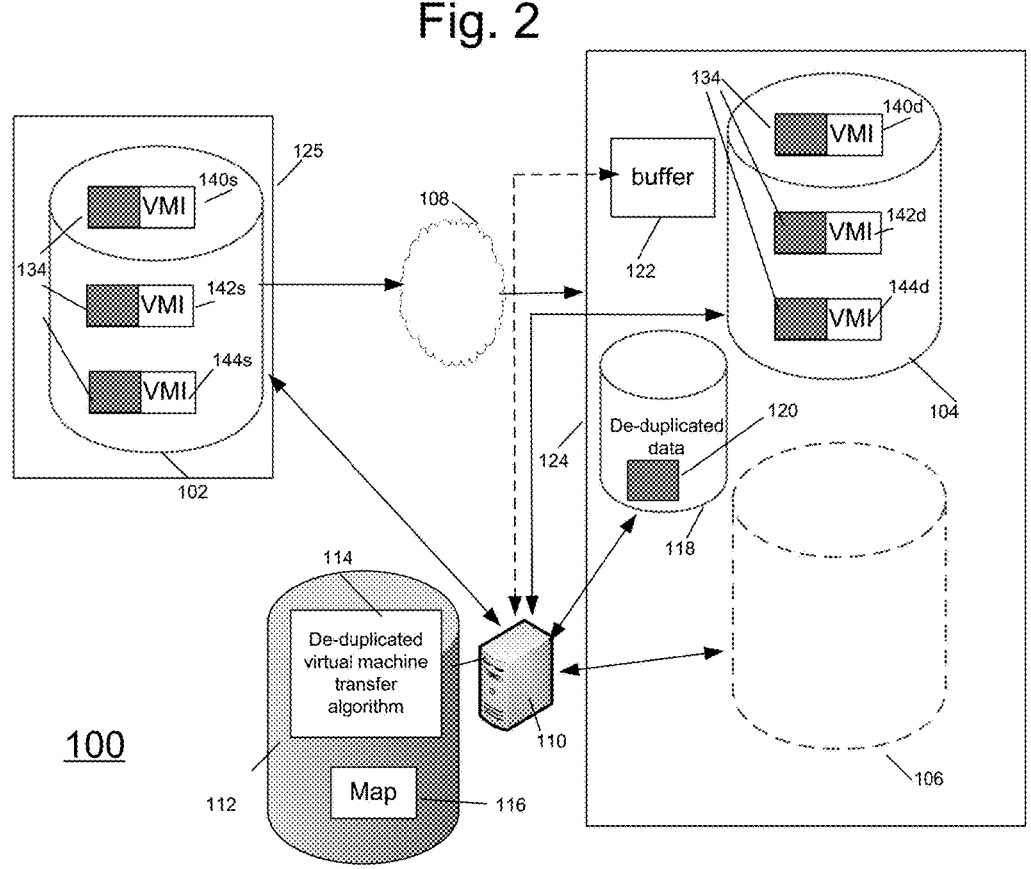
FIG. 2 illustrates some example systems that can be utilized to implement de-duplicated virtual machine image transfer.

FIG. 2 is illustrates some example systems that can be utilized to implement de-duplicated virtual machine image transfer arranged according to at least some embodiments described herein. Those components in FIG. 2 that are labeled identically to components of FIG. 1 will not be described again for the purposes of clarity.

Destination location 124 may further include a buffer 122, an interim memory 118 and/or one or more additional destination memories 106 configured to be in communication with each other. Processor 110 may be configured to be in communication with devices at destination location 124. Virtual machine images 140, 142, 144 may include, for example, an object encapsulating software and respective operating systems. Processor 110 may be adapted to facilitate transfer of virtual machine images from source memory 102 to destination memory 104 and/or destination memory 106. Transfer may be useful in contexts such as, migration, new application deployment, maintenance, storage, backup, etc. Each image may include a relatively large amount of data such as 3 GB. Much of the data in these images, perhaps as much as 95%, may be duplicated data 134 duplicated across one or more images. For example, images 140 and 142 may include the same operating system, libraries, etc. Algorithm 114 may control processor 110 to identify duplicated data 134. Processor 110 may copy duplicated data 134 from one of images 140, 142, 144 to interim memory 118 as de-duplicated data 120. De-duplicated data 120 may include a single version of data that is duplicated across two or more images. After duplicated data 134 is copied to interim memory 118 as de-duplicated data 120, processor 110 may be configured to control copying of de-duplicated data 120 from interim memory 118 to destination memory 104. In this way, one copy of duplicated data may be copied to interim memory 118 and then copied as many times as desired for destination memory 104.

Algorithm 114 may further provide instructions for facilitating copying of de-duplicated data 120 to destination memory 104. Destination memory 104 may be, for example, a disk. Algorithm 114 may be effective to reduce a number of times that disk/memory 104 needs to be loaded, spun, or accessed. This reduction in access of disk 104 may result in reducing a bottleneck in copying data to destination memory 104. As explained in more detail below, when processor 110 generates de-duplicated data 120, processor 110 may also generate a map 116. Map 116 may indicate which blocks of data in de-duplicated data 120 correspond to images 140, 142, 144. Map 116 may also indicate an order of the blocks in images 140, 142, 144. Blocks may be, for example, 4 kb sized portions of de-duplicated data 120.

Processor 110 may analyze map 116 and identify particular blocks that correspond to a particular virtual machine image. Once those particular blocks are identified, processor 110 may copy the particular blocks from interim memory 118 to destination memory 104 for one virtual machine image. As processor 110 retrieves blocks from interim memory 118, blocks that relate a different image, and not to the particular image being copied, may be stored in buffer 122. By continually writing data to one virtual machine image, a bottleneck in copying to a destination disk may be decreased. Disks at destination memory 104 need not be continually loaded and spun and disk access succession may be increased.

Figure 3:
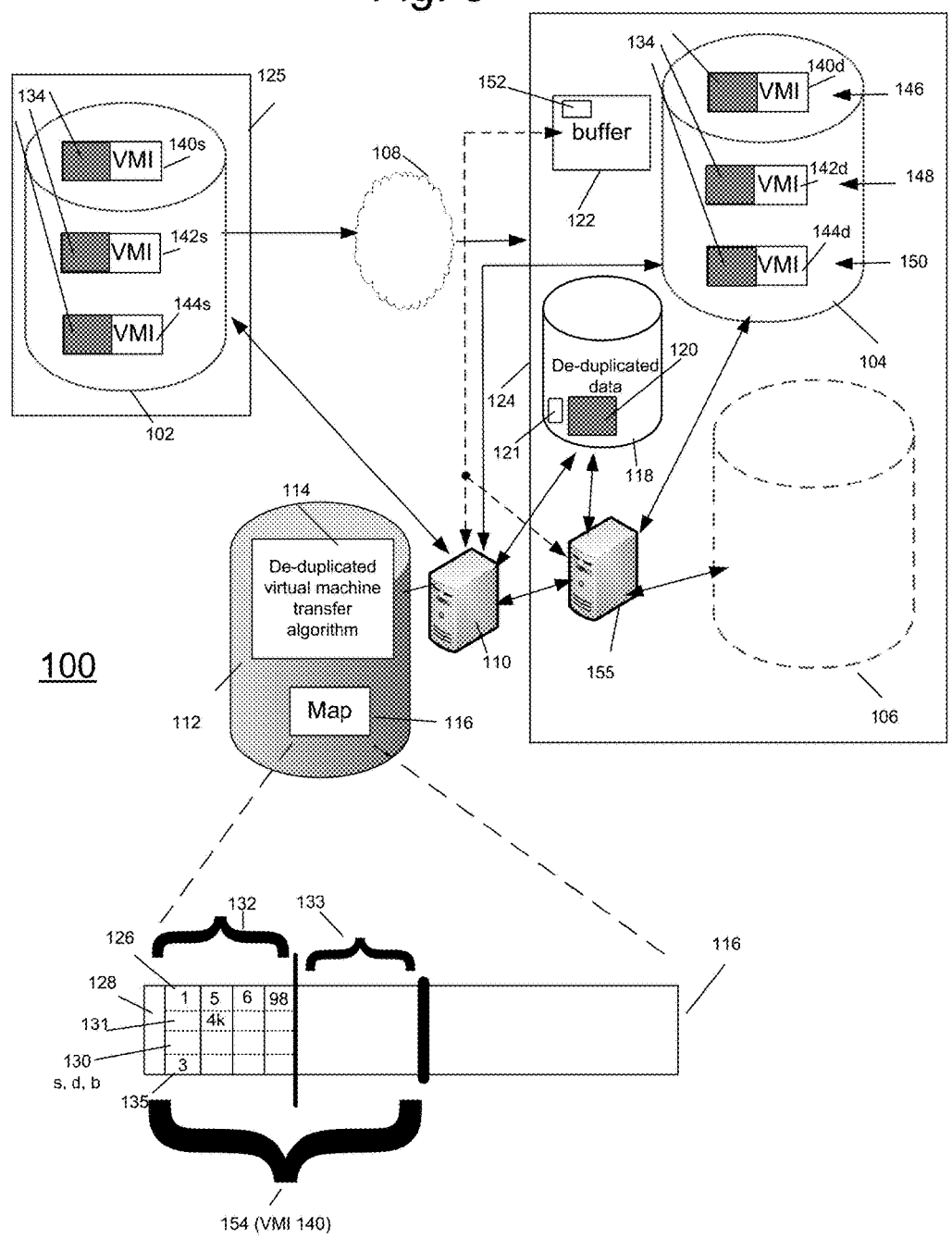
FIG. 3 illustrates some example systems that can be utilized to implement de-duplicated virtual machine image transfer.

FIG. 3 is illustrates some example systems that can be utilized to implement de-duplicated virtual machine image transfer arranged according to at least some embodiments described herein. Those components in FIG. 3 that are labeled identically to components of FIGS. 1 and 2 will not be described again for the purposes of clarity.

Algorithm 114 may control processor 110 to retrieve de-duplicated data 120 from interim memory 118 and write de-duplicated data 120 to destination memory 104. Processor 110 may write source virtual machine image 140$s$ as virtual machine image 140$d$ in location 146. Processor 110 may write source virtual machine image 142$s$ as virtual machine image 142$d$ in location 148. Processor 110 may write source virtual machine image 144$s$ as virtual machine image 144$d$ in location 150.

Processor 110 may include and/or communicate with a transfer module 155. Transfer module 155 may facilitate communication and requests among processor 110, buffer 122, interim memory 118 and/or source memory 102. In examples when processor 110 generates de-duplicated data 120, processor 110 may generate an image block map 121. The image block map 121 may be generated when images 140, 142, 144 are de-duplicated. Algorithm 114 may control processor 110 to generate map 116 based on the image block map 121.

Map 116 may be a data structure that includes two or more files 154. Files 154 may correspond to virtual machine images. In the example shown in FIG. 3, file 154 corresponds to virtual machine image 140. Files 154 may be divided by processor 110 into equally sized regions 132, 133. The region size may be, for example 4 MB (e.g. 100 data blocks of 4 KB size) Regions 132, 133 may include a block identifier field 126, a region buffer number count field 128, a block size field 131, a presence field 130 and/or a number of regions field 135. Block identifier field 126 may include an identifier for blocks in de-duplicated data 120 corresponding to region 132 of file (virtual machine image) 140. Number of regions field 135 may indicate a number of regions that are associated with a corresponding block identified in block identifier field 126.

In an example, map 116 may be divided into two or more files 154, each file corresponding to a respective virtual machine image 140, 142, 144. In the example, file 154 may be divided into two or more regions 132, 133. Each region may indicate a number of consecutive blocks in the corresponding virtual machine image and an order of the blocks in the virtual machine image. In the example shown, region 132 may correspond to a first region in virtual machine image 140. Region 132 includes blocks 1, 5, 6 and 98, in that order. As mentioned above, blocks in de-duplicated data 120 may appear in more than one virtual machine image. This means some of blocks 1, 5, 6 and 98 may appear in other virtual machine images such as image 142.

In the example shown in FIG. 3, processor 110 may retrieve one or more block of de-duplicated data from interim memory 118. For example, processor 110 may retrieve a complete region. In another example, processor 110 may analyze a current region and retrieve missing data blocks. Processor 110 may retrieve a complete region (e.g. the first region to be processed) if none of the blocks of the region are at the destination. Processor 110 may write blocks 1, 5, 6, and 98 to location 146 corresponding to virtual machine image 140d. After analyzing map 116, processor 110 knows what blocks are in region 132 of file 154 corresponding to virtual machine image 140. Processor 110 may copy blocks from interim memory 118 for file 154 (virtual machine image 140) before writing blocks for other files (other virtual machine images). Once a first block in file 154 is written to memory 104 for virtual machine image 140, destination disk/memory 104 is spinning and at location 146. As map 116 identifies other blocks in virtual machine image 140, processor 110 may be adapted to write more blocks for virtual machine image 140, at location 146, before writing data for other virtual machine images. By writing other blocks for virtual machine image 140 before writing blocks for other virtual machine images, processor 110 may increase efficiency in writing data to disk 104 because blocks are written sequentially. As blocks are written, presence field 130 may be updated to indicate whether blocks are stored at a source "s" interim memory 118, destination "d" memory 104, or in a buffer "b" 122.

As processor 110 sequentially retrieves blocks from interim memory 118, and writes blocks to virtual machine image 140d, processor 110 may determine that some blocks in interim memory 118 also correspond to other virtual machine images. For example, block "5" may correspond to virtual machine image 140d at location 146 and may correspond to virtual machine image 142d at location 148. While writing block "5" to virtual machine image 140d, instead of spinning disk/memory 104 to location 148, processor 110 may be adapted to copy block "5" into buffer 122. In the example, block "5" may be stored in buffer 122 for later access by processor 110 while processor 110 processes block 6. Processor 110 may thus avoid jumping in disk 104 from location 146 to location 148.

In an example, buffer 122 may have a size of about 200 MB. Processor 110 may update map 116 to indicate that block "5" is stored in buffer 122 by changing presence field 130 to indicate "b". Processor 110 may further update map 116 to increment region counter field 128. For example, image block map 121 may identify blocks along with corresponding virtual machine images and respective locations within the respective images. For example, an offset within the image may be identified. When a block is buffered, as discussed herein, image block map 121 may indicate other regions corresponding to the buffered block. Using the virtual machine image file name and offset, processor 110 can determine which regions correspond to the buffered block. This determination may be because the regions may be of a fixed size and may be consecutively stored in destination memory 104. The region counter may represent the number of blocks corresponding to a region that are stored at the destination memory 104 or in buffer 122. The region counter field may be used to identify a particular region that has most of its data stored at destination memory 104 and needs few blocks from source memory 102 to complete the region. This particular region may be migrated first or prior to other regions.

Processor 110 may read map 116 and identify regions 132, 134 to be copied to memory 104. For each region, processor 110 may determine whether blocks corresponding to the region are stored in buffer 122. If blocks corresponding to the region are stored in buffer 122, processor 110 may copy those blocks from buffer 122 to memory 104. If the blocks corresponding to the region are not stored in buffer 122, processor 110 may write those blocks from interim memory 118 to memory 104. If the blocks being written also correspond to other regions, processor 110 may write the blocks into buffer 122.

Processor 110 may continue to process regions until buffer 122 reaches a threshold level of fullness. For example, the threshold level may be 90% full. When buffer 122 reaches the threshold level, processor 110 may switch to an algorithm to free up space in buffer 122. Processor 110 may analyze map 116 and determine a number of blocks stored for respective regions. For example, processor 110 may analyze region count field 128. Processor 110 may identify a particular region with a threshold percentage of the particular region's blocks stored in buffer 122. Processor 110 may then process blocks of that particular region.

When processing the particular region with the threshold number of blocks buffered, processor 110 may copy blocks in the particular region from buffer 122 to all virtual machine images that include the blocks. By writing the blocks to all images, buffer 122 may be freed up. In another example, processor 110 may write blocks in buffer 122 for the particular region to the particular region and not to other regions. Processor 110 may continue to free up space in buffer 122 by processing regions with the threshold number of blocks buffered until some threshold of the buffer is reached—such one half of the buffer being full.

Buffer 122 may include a counter 152. Counter 152 may indicate, for each block, a number of regions where the respective block should be written. Counter 152 may be populated from data from number of regions field 135. As blocks are copied from buffer 122 to memory 104, counter 152 may be decremented. When counter 152 reaches 0, the corresponding block may be removed from the buffer 122. Processor 110 may write blocks stored in buffer 122 to each corresponding image 140, 142, 144 until counter 152 for the respective block reaches 0.

After freeing up the buffer, some regions may have some blocks stored but the region is not complete. Writing blocks from buffer 122 may result in some regions being partially copied from interim memory 118 to memory 104. Processor 110 may now complete copying these incomplete regions and then continue copying other regions. Processor 110 may cycle back and forth between a copying mode and a buffer freeing mode until full migration of images 140, 142, 144 is complete.

Performance Analysis

This section presents an analytical analysis of the potential improvements that may be realized by a system in accordance with this disclosure. Table 1 presents the variables used.

TABLE 1

Variables used in the performance analysis

| | |
|---|---|
| F | The total number of virtual machine (VM) images to be transferred. |
| S | The size of a VM image (one may assume for this analysis section that all images have the same size.) The total size of VM images to be migrated is F·S. |
| b | The number of data blocks per region. |
| r | The number of regions the data buffer can hold. i.e. the size of the buffer in regions. The number of blocks the buffer can hold is b·r. |
| c | The number of blocks that appear consecutively. E.g. c = 2 means in every region there are two blocks that appear in the same consecutive order in all the other files. |
| s(d) | The time taken to see to a new location that is d bytes away on the disk. The time equals: disk head seek time + rotation latency. In the analysis one may assume that the head seek time is constant. The rotation latency may be directly dependent on the distance the head needs to rotate, d. |

Disk seek overhead may be a main contributor to the performance degradation. Below, is an evaluation of the number of seeks that may be used to assemble a set of F images. To make the analytical analysis tractable and provide an insight on the factors that affect performance, below it is assumed the worst case scenario in which the similarity rate is 100% meaning all the virtual machine images include the same data blocks (but possibly in a different order). Hence, every block needs to be written to the F images at the destination. The described system's performance may be impacted by the degree of similarity of regions across files. This is modeled by the parameter c in the model.

As each data block is part of the F images under transfer, an alternate approach where each block from interim memory 118 is written to each virtual image that includes the block, will suffer from F disk seeks for each data block. This may result in a total of (b·F) disk seeks per region regardless of the block pattern; i.e., regardless of the parameter c. Consequently the total seek overhead, per region, may be (b·F·s(dc)).

In contrast, a simplified migration algorithm may include:
1. Select a region in the file and transfer the blocks in the region sequentially. As all the blocks in the region are part of other F files, all the blocks in the region may be retained in the buffer.
2. When the data buffer is full (i.e. has buffered r regions) the algorithm writes the buffered blocks to the (F−1) files they are part of, without bringing any new blocks.

Analysis of the Simplified Migration Algorithm:

During point 1 in the simplified algorithm, the algorithm will have one disk seek to start writing to a region and then write all the region's blocks sequentially. This leads to one seek per region (or per b blocks).

After writing r regions the buffer is full. The algorithm will write every block to the (F−1) files that the block is part of. Since c of the blocks of every region may be consecutive in every file the algorithm will acquire (F−1) seeks for the consecutive c blocks and (F−1) for every non-consecutive block. In total the algorithm will acquire (F−1)+(b−c)(F−1)=(b−c+1)(F−1) seeks per region. In total, the algorithm imposes (1+(b−c+1)·(F−1))·s(da) seek time to transfer one region. da denotes the average distance traveled per seek using the simplified algorithm.

Compared to the other approaches, the relative performance of the simplified approach in transferring one region is:

$$(1+(b-c+1)(F-1)\cdot s(d_a)/b\cdot F\cdot s(d_c)$$

This analysis shows that the performance gain is impacted by: the size of the region, the level of region similarity, and the seek distance.

Constant Seek Overhead Analysis

To understand the impact of the region size b and region similarity c on the relative performance one may assume that the seek overhead is equal between the two approaches; that is da=dc. The relative performance becomes:

$$1+(b-c+1)(F-1)/b\cdot F$$

This formula shows that in the worst case (with c=1, i.e. no two blocks appear in the same region more than once across files), for every seek in the alternate approaches the simplified algorithm may perform (F−1)/F seeks. In other words, the simplified approach reduces the number of seeks by 1/F. On the other end of the spectrum, c=b, i.e. the blocks in a region in a file appear exactly in the same order across files, for every seek in the simplified algorithm. The described approach may perform b seeks achieving b times performance improvement. This improvement may be mainly because the mechanism can efficiently use the buffer to achieve improved disk access succession.

Seeks-Distance Impact Analysis

The seek overhead may be directly dependent on the distance the disk needs to rotate. The following analyzes the seek distance:

In an alternate approach, every block needs to be written to every file. In the best case, the alternate approach may impose a seek distance of 0 (in case the current block is the last bock in the current image and the first block in the next image) and a seek distance of 2·S in the worst case. The seek distance follows a triangular probability distribution with parameters a=0, b=2·S and c=S with a mean value of S. Consequently, on average the alternate approach imposes an average seek overhead of s(S).

The average seek distance in the simplified algorithm:

The simplified approach writes the blocks (total of b·r blocks) in all regions in order (i.e. the blocks are sorted based on their offset). Consequently, assuming a uniform random distribution of blocks across files and offsets the mechanism imposes on average s(S·F/b·r) seek overhead.

This analysis shows that the proposed mechanism achieves F/b·r times shorter seek distance. This may be a significant improvement since r·b>>F. The experimental evaluation (below) shows that the impact of this improvement on transfer rate is significant.

CONCLUSION

The proposed approach achieves significant performance gains compared to other approaches. This is so because the discussed algorithm reduces the number of seeks but also significantly reduces the seek overhead. For instance, for migrating 5 VM images with b set to a reasonable value of 100 4 KB blocks (and assuming equal seek overhead) the mechanism can achieve up to 100 times, and at least 20% better performance compared to other approaches.

Also, given the nature of virtual machine images, often a group of blocks appear in the same region across files (i.e., there is high region similarity), since these blocks often belong to the same file in the virtual machine image (same OS kernel, library, or application files). The performance gains may therefore be considerably higher than the minimum of 1/F.

Experimental Evaluation

This section presents an evaluation of the impact the seek overhead has on the write operation throughput of large virtual machine images. Seek overhead may be a mechanical operation of a disk moving from one location to another. The evaluation writes 10 GB files to disk using different block sizes. The evaluation compares three write patterns: sequential, random, and a 'regular' write pattern. For the random pattern the block write order is selected randomly from the possible n! block orders—where n is the total number of blocks. Using probability analysis, the expected seek distance may be ⅓ of the file size (in the example equal to disk distance for storing 3.3 GB of data). The regular pattern divides the file into 10,000 segments and writes one block to each segment in a round robin fashion. The goal of this pattern is to measure the impact of seek distance on the disk write throughput. Like the random pattern, this pattern may use a seek for every block write, unlike the random pattern the seek distance is 1/10,000 of the file size which in the evaluation is equal to disk distance for storing 1 MB of data.

The random pattern may represent the pattern generated by the other virtual machine transfer approaches, while the regular pattern represents pattern generated by the described mechanism in the worst case (c=1 in the analysis). Finally, the sequential pattern represents the highest possible performance in the described system and approximates the performance in the best case scenario.

Figure 4:
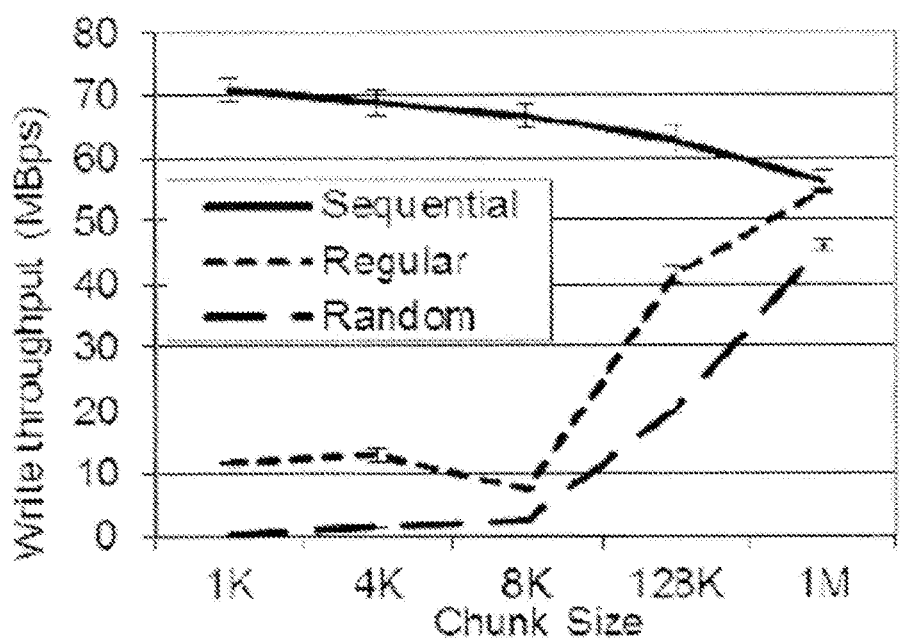
FIG. 4 is a figure illustrating write throughput vs. chunk size including data in an experiment of a system implementing de-duplicated virtual machine image transfer.

The evaluation was run on a machine with an Intel Xeon E5345 4-core, 2.33-GHz CPU, 4-GB RAM, and a 300-GB 7200-rpm SATA disks. Each experiment was repeated 10 times. Shown are average and standard deviation (as error bars). The table below FIG. 4 is a table illustrating write throughput vs. chunk size including data in an experiment of a system implementing de-duplicated virtual machine image transfer arranged in accordance with an embodiment of the disclosure. FIG. 4 shows the write throughput of the three patterns while varying the block size. The results lead to the following observations:

Random writes with small block sizes (typical in virtual machine de-duplication) achieve low performance (110 KBps with 1 KB blocks), up to three orders of magnitudes slower than the sequential write pattern. Regular write pattern performs better than random writes (up to two orders of magnitude better in small blocks) due to the much shorter seek distance. The evaluation shows that a system in accordance with the disclosure not only increases disk access succession but also minimizes seek distance.

Among other possible benefits, a system in accordance with the disclosure may speed up transfer of virtual machine image data. Bottlenecks in disc access may be reduced. The system may increase disk performance, and reduce multiple disk accesses and unnecessary disk rotation. Disk access succession may be increased. Hard disk usage may be reduced resulting in lower energy cost and lower disk wear.

The disclosed system may optimize the storage and transfer of a group of virtual machine images. This system may be used when transferring a group of virtual machine images from a de-duplicated virtual machine repository to a non-de-duplicated one. The system may be used when transferring groups of virtual machine images across de-duplicated virtual machine repositories that do not use the same de-duplication technique and configuration.

Figure 5:
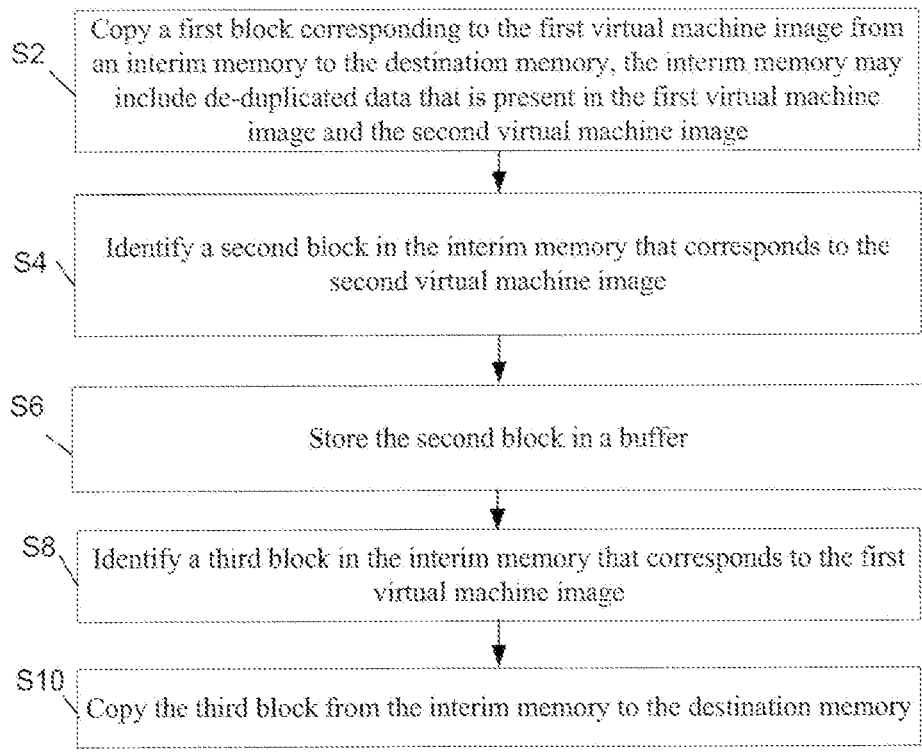
FIG. 5 depicts a flow diagram for example processes for implementing de-duplicated virtual machine image transfer.

FIG. 5 depicts a flow diagram for example processes for implementing de-duplicated virtual machine image transfer arranged in accordance with at least some embodiments described herein. The process in FIG. 5 could be implemented using, for example, system 100 discussed above to copy a first virtual machine image and a second virtual machine image from a source memory to a destination memory. An example process may include one or more operations, actions, or functions as illustrated by one or more of blocks S2, S4, S6, S8 and/or S10. Although illustrated as discrete blocks, various blocks may be divided into additional blocks, combined into fewer blocks, or eliminated, depending on the desired implementation.

Processing may begin at block S2, "Copy a first block corresponding to the first virtual machine image from an interim memory to the destination memory, the interim memory may include de-duplicated data that is present in the first virtual machine image and the second virtual machine image." At block S2, a first processor may be configured to analyze an interim memory and copy a block from the interim memory to the destination memory. The interim memory may include de-duplicated data present in a first and second virtual machine image. The interim memory may include an image block map relating to the de-duplicated data. The processor may further generate a file map identifying blocks in the interim memory and virtual machine images corresponding to the blocks. The file map may include files corresponding to the virtual machine images. The files may include regions. The regions may include a block identifier field, a region buffer number count field, a block size field, a presence field and/or a number of regions field.

Processing may continue from block S2 to block S4, "Identify a second block in the interim memory that corresponds to the second virtual machine image." At block S4, the processor may analyze the interim memory and identify a second block corresponding to the second virtual machine image.

Processing may continue from block S4 to block S6, "Store the second block in a buffer." At block S6, the processor may store the second block in a buffer.

Processing may continue from block S6 to block S8, "Identify a third block in the interim memory that corresponds to the first virtual machine image. At block S8, the processor may identify a third block corresponding to the first virtual machine image.

Processing may continue from block S10, "Copy the third block from the interim memory to the destination memory." At block S10, the first processor may copy the third block from the interim memory to the destination memory.

Figure 6:
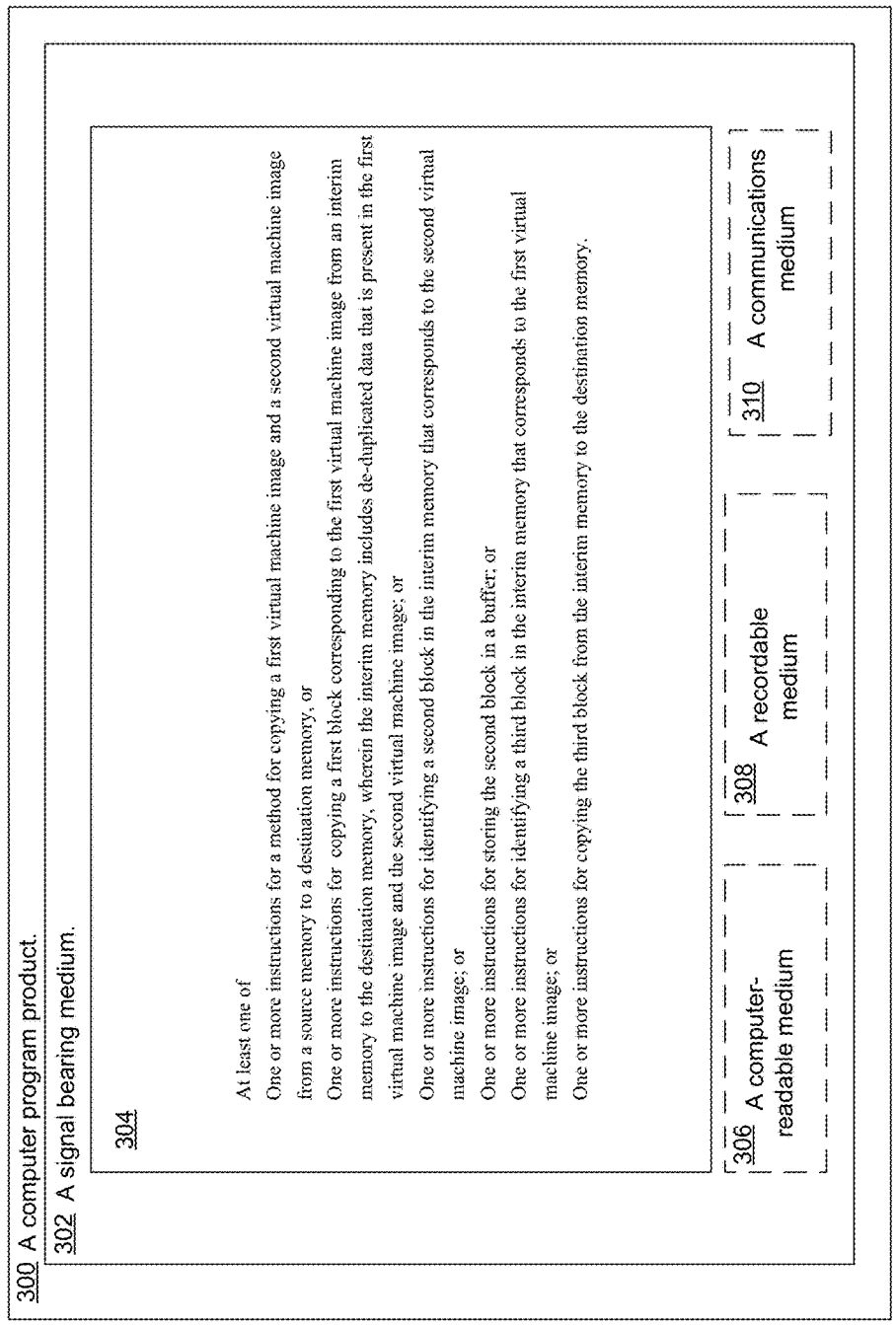
FIG. 6 illustrates computer program products for implementing de-duplicated virtual machine image transfer.

FIG. 6 illustrates computer program products 300 for implementing de-duplicated virtual machine image transfer arranged in accordance at least some embodiments described herein. Program product 300 may include a signal bearing medium 302. Signal bearing medium 302 may include one or more instructions 304 that, when executed by, for example, a processor, may provide the functionality described above with respect to FIGS. 1-5. Thus, for example, referring to system 100, processor 110 may undertake one or more of the blocks shown in FIG. 6 in response to instructions 304 conveyed to the system 100 by medium 302.

In some implementations, signal bearing medium 302 may encompass a computer-readable medium 306, such as, but not limited to, a hard disk drive, a Compact Disc (CD), a Digital Video Disk (DVD), a digital tape, memory, etc. In some implementations, signal bearing medium 302 may encompass a recordable medium 308, such as, but not limited to, memory, read/write (R/W) CDs, R/W DVDs, etc. In some implementations, signal bearing medium 302 may encompass a communications medium 310, such as, but not limited to, a digital and/or an analog communication medium (e.g., a fiber optic cable, a waveguide, a wired communications link, a wireless communication link, etc.). Thus, for example, program product 300 may be conveyed to one or more modules of the system 100 by an RF signal bearing medium 302, where the signal bearing medium 302 is conveyed by a wireless communications medium 310 (e.g., a wireless communications medium conforming with the IEEE 802.11 standard).

Figure 7:
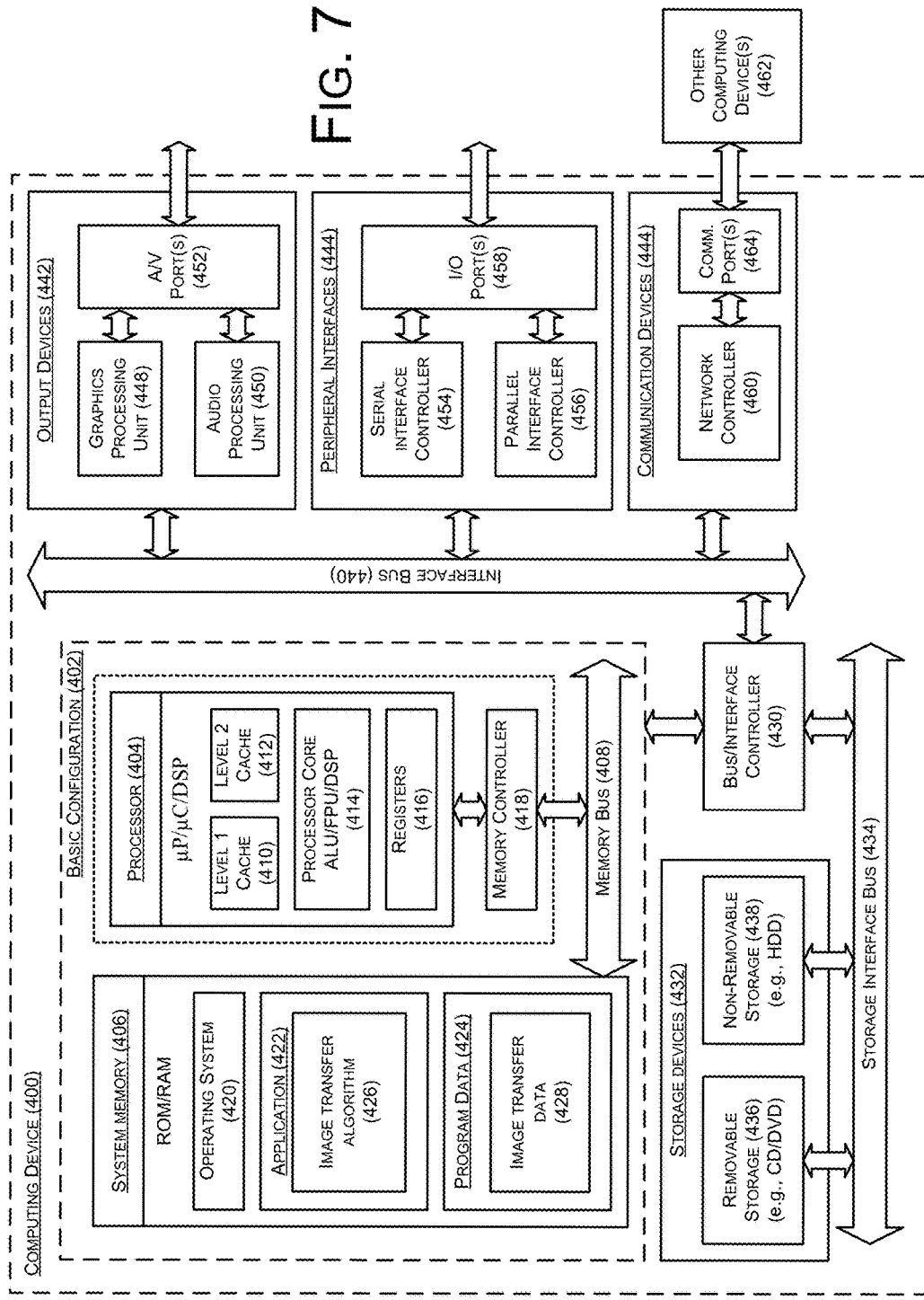
FIG. 7 is a block diagram illustrating an example computing device that is arranged to implement de-duplicated

FIG. 7 is a block diagram illustrating an example computing device 400 that is arranged to implement de-duplicated virtual machine image transfer arranged in accordance with at least some embodiments described herein. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (μP), a microcontroller (μC), a digital signal processor (DSP), or any combination thereof. Processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424.

Application 422 may include an image transfer algorithm 426 that is arranged to perform the functions as described herein including those described previously with respect to FIGS. 1-6. Program data 424 may include image transfer data 428 that may be useful for implementing de-duplicated virtual machine image transfer as is described herein. In some embodiments, application 422 may be arranged to operate with program data 424 on operating system 420 such that de-duplicated virtual machine image transfer may be provided. This described basic configuration 402 is illustrated in FIG. 7 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method, performed by a processor configured to execute computer instructions stored in a memory, to copy a first virtual machine image and a second virtual machine image from a source memory to a destination memory, the method comprising:

copying a first block that corresponds to the first virtual machine image from an interim memory to the destination memory, wherein the interim memory includes de-duplicated data that is present in the first virtual machine image and the second virtual machine image, and wherein the interim memory is different from the source memory and the destination memory;

after copying the first block, identifying a second block in the interim memory;
in response to a determination that the identified second block corresponds to the second virtual machine image, storing the second block in a buffer;
after storing the second block, identifying a third block in the interim memory that corresponds to the first virtual machine image;
copying the third block from the interim memory to the destination memory;
in response to copying the third block from the interim memory to the destination memory, determining whether all blocks that correspond to the first virtual machine image have been copied from the interim memory to the destination memory; and
in response to a determination that all blocks that correspond to the first virtual machine image have been copied from the interim memory to the destination memory, copying the second block from the buffer to the destination memory,
wherein copying the second block, which corresponds to the second virtual machine image, from the buffer to the destination memory, after copying all blocks, which correspond to the first virtual machine image, from the interim memory to the destination memory, facilitates continual copying of blocks that correspond to the first virtual machine image, resulting in reduction in frequency of loading, spinning, and accessing the destination memory, and increase in efficiency of writing the first virtual machine image to the destination memory.

2. The method of claim 1, further comprising:
identifying duplicated data, wherein the duplicated data is present in the first and second virtual machine images that are located at the source memory; and
copying the duplicated data from the source memory to the interim memory to produce the de-duplicated data.

3. The method of claim 2, wherein copying the duplicated data from the source memory to the interim memory produces an image block map.

4. The method of claim 1, further comprising generating a map, wherein the map identifies blocks in the interim memory, and virtual machine images that correspond to the blocks in the interim memory.

5. The method of claim 1, further comprising:
generating a map, wherein the map identifies blocks in the interim memory, and virtual machine images that correspond to the blocks in the interim memory,
and
wherein the map includes:
a first file that corresponds to the first virtual machine image, and
a second file that corresponds to the second virtual machine image.

6. The method of claim 1, further comprising:
generating a map, wherein the map identifies blocks in the interim memory, and virtual machine images that correspond to the blocks in the interim memory,
wherein the map includes:
a first file that corresponds to the first virtual machine image, and
a second file that corresponds to the second virtual machine image,
wherein each of the first and second files includes one or more regions, and wherein each of the one or more regions includes a block identifier field, a region buffer number count field, a block size field, a presence field, and/or a number of regions field.

7. The method of claim 1, further comprising:
generating a map, wherein the map identifies blocks in the interim memory, and virtual machine images that correspond to the blocks in the interim memory,
wherein the map includes:
a first file that corresponds to the first virtual machine image, and
a second file that corresponds to the second virtual machine image,
wherein the first file includes two or more regions, and wherein each of the two or more regions includes an identification of consecutive blocks of the de-duplicated data that corresponds to the first virtual machine image.

8. The method of claim 1, further comprising:
generating a map, wherein the map identifies blocks in the interim memory, and virtual machine images that correspond to the blocks in the interim memory, and
wherein the map indicates that the blocks are stored in the source memory, the destination memory, and/or the buffer.

9. The method of claim 1, further comprising:
generating a map, wherein the map identifies blocks in the interim memory, and virtual machine images that correspond to the blocks in the interim memory, and
wherein the map includes a region count field that is effective to indicate a number of second blocks that are stored in the buffer.

10. The method of claim 1, further comprising:
copying blocks from the interim memory to the destination memory, until the buffer is full to a threshold level;
after the buffer is full to the threshold level, identifying a particular region, wherein a particular percentage of blocks that correspond to the particular region are stored in the buffer; and
copying the blocks that correspond to the particular region from the interim memory to the destination memory.

11. The method of claim 1, further comprising:
copying blocks from the interim memory to the destination memory, until the buffer is full to a threshold level;
after the buffer is full to the threshold level, identifying a particular region, wherein a particular percentage of blocks that correspond to the particular region are stored in the buffer;
copying the blocks that correspond to the particular region from the interim memory to the destination memory; and
copying the blocks that correspond to the particular region from the interim memory to other regions in other virtual machine images that include the blocks that correspond to the particular region.

12. The method of claim 1, further comprising:
incrementing a counter in the buffer, in response to storing the second block in the buffer;
copying blocks from the interim memory to the destination memory, until the buffer is full to a threshold level; and
after the buffer is full to the threshold level, performing:
identifying a particular region, wherein a particular percentage of blocks that correspond to the particular region are stored in the buffer;
copying the blocks that correspond to the particular region from the interim memory to the destination memory;
copying the blocks that correspond to the particular region from the interim memory to other regions in other virtual machine images that include the blocks that correspond to the particular region; and
decrementing the counter when blocks in the buffer are copied to the destination memory;
until the buffer reaches another threshold level.

13. The method of claim 1, further comprising:
copying blocks from the interim memory to the destination memory, until the buffer is full to a threshold level;
identifying a particular region, wherein a particular percentage of blocks that correspond to the particular region are stored in the buffer;
copying the blocks that correspond to the particular region from the interim memory to the destination memory;
copying the blocks that correspond to the particular region from the interim memory to other regions in other virtual machine images that include the blocks that correspond to the particular region;
identifying a partially full region that includes some blocks copied from the interim memory to the destination memory; and
copying blocks that correspond to the partially full region from the interim memory to the destination memory.

14. A system effective to copy a first virtual machine image and a second virtual machine image from a source memory to a destination memory, the system comprising:
an interim memory, different from the source memory and the destination memory; and
a processor configured to communicate with the interim memory, the source memory, and the destination memory, wherein the processor is effective to:
copy a first block that corresponds to the first virtual machine image from the interim memory to the destination memory, wherein the interim memory includes de-duplicated data present in the first and second virtual machine images;
after copying the first block, identify a second block in the interim memory;
in response to a determination that the identified second block corresponds to the second virtual machine image, store the second block in a buffer;
after the storage of the second block, identify a third block in the interim memory that corresponds to the first virtual machine image;
copy the third block from the interim memory to the destination memory;
in response to copying the third block from the interim memory to the destination memory, determine whether all blocks that correspond to the first virtual machine image have been copied from the interim memory to the destination memory; and
in response to a determination that all blocks that correspond to the first virtual machine image have been copied from the interim memory to the destination memory, copy the second block from the buffer to the destination memory,
wherein copying the second block, which corresponds to the second virtual machine image, from the buffer to the destination memory, after copying all blocks, which correspond to the first virtual machine image, from the interim memory to the destination memory, facilitates continual copying of blocks that correspond to the first virtual machine image, which results in reduction in frequency of loading, spinning, and accessing the destination memory.

15. The system of claim 14, wherein the processor is further effective to:
generate a map, wherein the map identifies blocks in the interim memory, and virtual machine images that correspond to the blocks in the interim memory, and
wherein the map indicates that the blocks are stored in the source memory, the destination memory, and/or the buffer.

16. The system of claim 14, wherein the processor is further effective to:
copy blocks from the interim memory to the destination memory, until the buffer is full to a threshold level;
after the buffer is full to the threshold level, identify a particular region, wherein a particular percentage of blocks that correspond to the particular region are stored in the buffer; and
copy the blocks that correspond to the particular region from the interim memory to the destination memory.

17. The system of claim 14, wherein the processor is further effective to:
copy blocks from the interim memory to the destination memory, until the buffer is full to a threshold level;
after the buffer is full to the threshold level, identify a particular region, wherein a particular percentage of blocks that correspond to the particular region are stored in the buffer;
copy the blocks that correspond to the particular region from the interim memory to the destination memory; and
copy the blocks that correspond to the particular region from the interim memory to other regions in other virtual machine images that include the blocks that correspond to the particular region.

18. The system of claim 14, wherein the processor is further effective to:
increment a counter in the buffer in response to storage of the second block in the buffer;
copy blocks from the interim memory to the destination memory, until the buffer is full to a threshold level; and
after the buffer is full to the threshold level, perform:
identify a particular region, wherein a particular percentage of blocks that correspond to the particular region are stored in the buffer;
copy the blocks that correspond to the particular region from the interim memory to the destination memory;
copy the blocks that correspond to the particular region from the interim memory to other regions in other virtual machine images that include the blocks that correspond to the particular region; and
decrement the counter when blocks in the buffer are copied to the destination memory;
until the buffer reaches another threshold level.

19. The system of claim 14, wherein the processor is further effective to:
copy blocks from the interim memory to the destination memory until, the buffer is full to a threshold level;
identify a particular region, wherein a particular percentage of blocks that correspond to the particular region are stored in the buffer;
copy the blocks that correspond to the particular region from the interim memory to the destination memory;
copy the blocks that correspond to the particular region from the interim memory to other regions in other virtual machine images that include the blocks that correspond to the particular region;
identify a partially full region that includes some blocks copied from the interim memory to the destination memory; and copy blocks that correspond to the partially full region from the interim memory to the destination memory.

20. A method to copy a first virtual machine image and a second virtual machine image from a source memory to a destination memory, the method comprising:

identifying duplicated data, wherein the duplicated data is present in the first and second virtual machine images;

copying the duplicated data from the source memory to an interim memory to produce de-duplicated data and an image block map, wherein the interim memory is different from the source memory;

generating a file map based on the image block map, wherein the file map identifies blocks in the interim memory, and virtual machine images that correspond to the blocks in the interim memory;

copying, based on the file map, a first block that corresponds to the first virtual machine image from the interim memory to the destination memory, wherein the interim memory is different from the destination memory;

after copying the first block, identifying a second block in the interim memory;

in response to a determination that the identified second block corresponds to the second virtual machine image, storing the second block in a buffer;

after storing the second block, identifying a third block in the interim memory that corresponds to the first virtual machine;

copying the third block from the interim memory to the destination memory;

in response to copying the third block from the interim memory to the destination memory, determining whether all blocks that correspond to the first virtual machine image have been copied from the interim memory to the destination memory; and in response to a determination that all blocks that correspond to the first virtual machine image have been copied from the interim memory to the destination memory, copying the second block from the buffer to the destination memory, wherein copying the second block, which corresponds to the second virtual machine image, from the buffer to the destination memory, after copying all blocks, which correspond to the first virtual machine image, from the interim memory to the destination memory, facilitates continual copying of blocks that correspond to the first virtual machine image, resulting in reduction in frequency of loading, spinning, and accessing the destination memory, and wherein the file map includes:
a first file that corresponds to the first virtual machine image, and
a second file that corresponds to the second virtual machine image,
wherein the first file includes two or more regions, and wherein each of the two or more regions includes:
an identification of consecutive blocks of the de-duplicated data that corresponds to the first virtual machine image,
an indication that the blocks are stored in the source memory, the destination memory, and/or the buffer, and
a region counter that is effective to indicate a number of second blocks that are stored in the buffer.

21. The method of claim 20, further comprising:
copying the blocks from the interim memory to the destination memory, until the buffer is full to a threshold level;
after the buffer is full to the threshold level, identifying a particular region, wherein a particular percentage of blocks that correspond to the particular region are stored in the buffer;
copying the blocks that correspond to the particular region from the interim memory to the destination memory; and
copying the blocks that correspond to the particular region from the interim memory to other regions in other virtual machine images that include the blocks that correspond to the particular region.

22. The method of claim 20, further comprising:
copying the blocks from the interim memory to the destination memory until the buffer is full to a threshold level;
after the buffer is full to the threshold level, identifying a particular region, wherein a particular percentage of blocks that correspond to the particular region are stored in the buffer;
copying the blocks that correspond to the particular region from the interim memory to the destination memory;
copying the blocks that correspond to the particular region from the interim memory to other regions in other virtual machine images that include the blocks that correspond to the particular region;
identifying a partially full region that includes some blocks copied from the interim memory to the destination memory; and
copying blocks that correspond to the partially full region from the interim memory to the destination memory.

* * * * *

UNITED STATES PATENT AND TRADEMARK OFFICE
CERTIFICATE OF CORRECTION

PATENT NO. : 9,886,352 B2
APPLICATION NO. : 13/824761
DATED : February 6, 2018
INVENTOR(S) : Al-Kiswany et al.

Page 1 of 1

It is certified that error appears in the above-identified patent and that said Letters Patent is hereby corrected as shown below:

On the Title Page

Item (73), under "Assignee", in Column 1, Lines 1-2, delete "UNIVERSITY OF BRITISH COLUMBIA (CA)" and insert -- UNIVERSITY OF BRITISH COLUMBIA, VANCOUVER (CA) --, therefor.

Signed and Sealed this
Twentieth Day of November, 2018

Andrei Iancu
*Director of the United States Patent and Trademark Office*